Patented Nov. 29, 1949

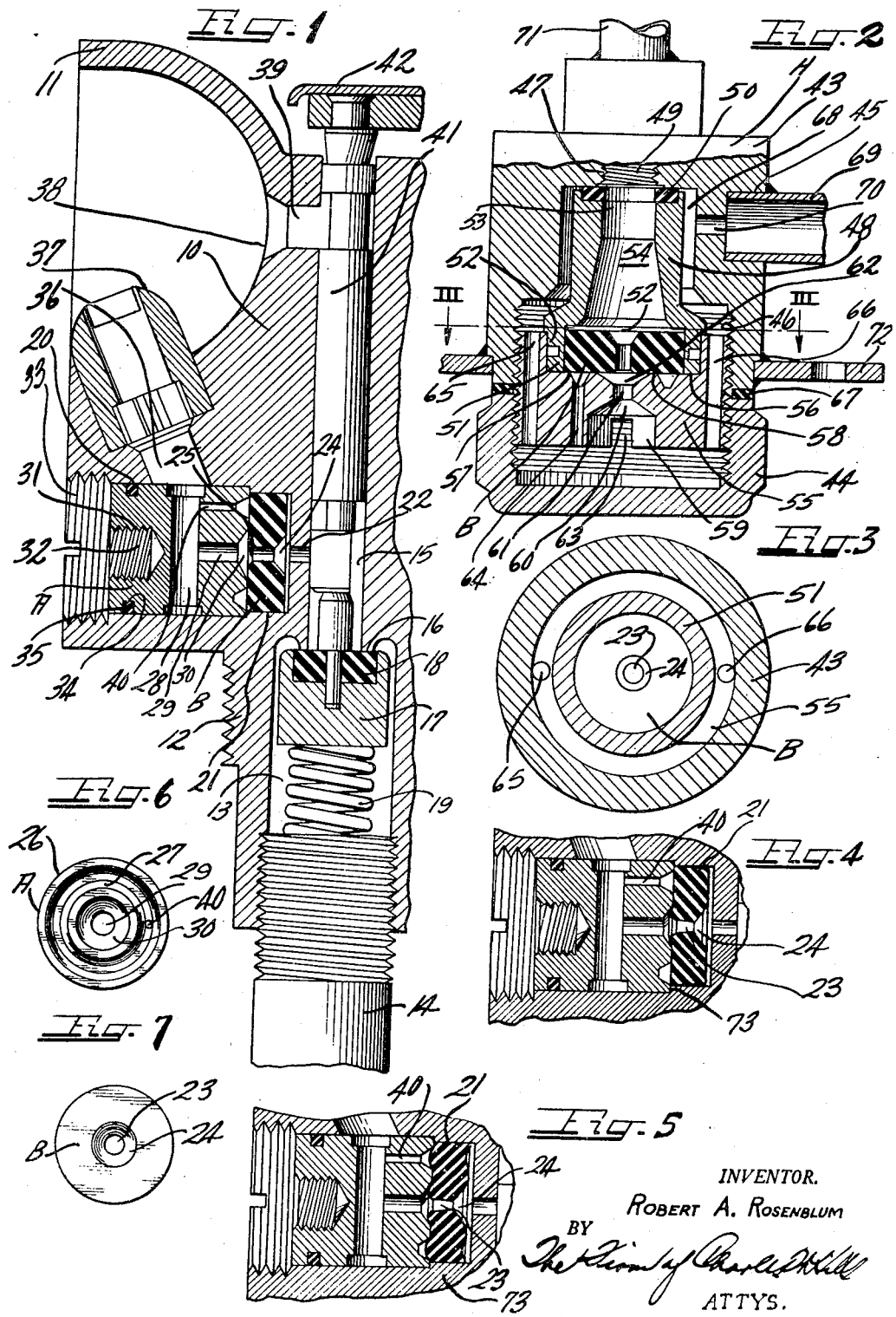

2,489,542

UNITED STATES PATENT OFFICE 2,489,542

FLOW CONTROL MEANS AND METHOD

Robert A. Rosenblum, Chicago, Ill., assignor to The Dole Valve Company, Chicago, Ill., a corporation of Illinois Application July 26, 1946, Serial No. 686,506

8 Claims. (Cl. 138—45)

The present invention relates generally to flow control means and method, and more particularly to a deformable resilient ring valve member for equalizing pressure of a fluid stream to automatically maintain the pressure of the fluid issuing from the valve chamber within certain limits, regardless of the pressure of the fluid in the supply line.

The present invention lends itself readily to the manufacture of products which, when in use, are connected to water supply mains of municipalities through a large part of the country and in which products the water is used at a more or less constant pressure, and which supply pressures vary through a wide range. Many expensive and intricate pressure equalizers are known and used in such products.

However, the present invention may be built in such products at the factory and will automatically function satisfactorily and efficiently anywhere to maintain the useful outlet pressure of the water at the desired value, regardless of the variations of wide range of pressures experienced in municipal water supplies.

While the present invention is capable of general application, it will herein be illustrated and described in connection with a drinking fountain of the bubbler type.

An object of the present invention is to provide a method of automatically maintaining a substantially constant rate of flow through an outlet where the pressures of the fluid supplied vary over a wide range.

Another object of the present invention is to provide means of simple construction for automatically maintaining a substantially constant rate of fluid flow through an outlet.

A yet further object is to provide an improved flow control ring of the same general character as that disclosed in Brown Patent No. 2,389,134, granted November 20, 1945.

A further object of the present invention is to provide a deformable rubber ring as a valve member for automatically maintaining a substantially constant rate of fluid flow through an outlet regardless of the fluid pressure in the supply line.

A still further object of the present invention is to provide a deformable rubber ring as a valve member for automatically controlling fluid flow to a plenum or pressure head chamber so that discharge from the chamber will be uniform and at low pressure.

A still further object of the present invention is to provide a deformable rubber ring as a valve member in which the deformation of the ring is proportional to the inlet or supply pressure of the fluid used.

According to the principles of the present invention a deformable rubber valve ring member is loosely supported adjacent a valve seat with one of its flat faces against the seat and the other of its flat faces directly exposed to pressure of a fluid stream from a supply line, with the valve member at right angles to the direction of flow from the supply line. The stream from the supply line strikes the ring and some passes through the orifice in the ring. The orifice being restricted, the supply line pressure will urge the ring member against the seat and deform or compress the ring in its central portion. Such deformation or compression will reduce the cross-sectional area of the ring orifice, thus reducing the pressure of the fluid issuing from such orifice. When the supply pressure is high the ring valve member will be depressed to a greater extent, such deformation tending to change the cylindrical shape of the ring and force parts of it into spaces of the seat valve member.

The above, other and further objects of the present invention will be apparent from the following description and accompanying drawing.

The accompanying drawing illustrates embodiments of the present invention and the views thereof are as follows:

Figure 1 is a central sectional view through the head of a bubbler fountain showing the flow control of the present invention, the parts appearing in their positions when there is no liquid flow from the supply line.

Figure 2 is a view partially in central section and partially in elevation, of a housing equipped with the present invention and which may be connected in a bubbler fountain.

Figure 3 is a horizontal sectional view taken in the plane of line III—III of Figure 2.

Figure 4 is a central sectional view through a valve chamber equipped with the flow control of the present invention and showing deformation of the ring valve member as influenced by the pressure of the fluid supply, to bend the ring valve member to restrict the cross-sectional area of the orifice through it for reducing the pressure of fluid issuing from the valve member.

Figure 5 is a view similar to Figure 4 showing greater deformation of the ring valve member to restrict the valve member orifice to a greater extent, and to displace portions of the valve member into the seat member recesses.

Figure 6 is a plan view of the valve seat; and

Figure 7 is a plan view of a flat surface of the ring valve member which is the surface exposed to inlet pressure from the fluid supply main.

On the drawings:

Referring to Figure 1, 10 designates the head of a bubbler fountain, which head includes a bowl 11. The head 10 is provided with a threaded neck 12 whereby the head may be secured in a fountain. The neck 12 is bored at 13 in which bore an inlet pipe 14 is connected to supply water to the head from the municipal main. The head 10 is provided with a second bore 15 axially aligned with the bore 13 but of smaller diameter. The head is formed with a valve seat 16 at the junction of the bores 13 and 15 with which seat a shut-off valve 17 cooperates to control the entry of city water to the bore 15. The valve 17 is counterbored to receive a packing washer 18 to engage the seat 16 in leak-tight relationship when the valve is closed. The valve is held in closed position by means of a compression spring 19, one end of which bears against the valve 17 and the other end of which is suitably supported in the neck 12.

The head 10 has another bore 20 formed in it at right angles to the bore 15 forming a valve chamber.

The head 10 is formed with a counterbore 21 communicating with the lower end of the bore 20, the diameter of the counterbore being slightly less than the diameter of the bore 20 to form a ledge 73 at the junctions of the bores.

The head 10 is provided with a port 22 affording communication between the bore 15 and the bore 20. It will be noted that the port 22 lies in the axis of the bore 20 in the bottom of the valve chamber.

Within the bore 20 are the valve seat member A and the ring valve member B of the present invention.

The ring valve member B is formed as a cylindrical ring of elastic material, such as rubber, rubber composition, plastic material such as "neoprene," or the like, with its opposite faces parallel under normal conditions, as illustrated in Figures 1 and 2. The ring valve member B has an orifice 23 through it arranged in the axis of the ring, the entrance end of which orifice is enlarged as by a countersunk portion 24 while the exit end of the orifice is slightly enlarged as at 25. It will be noted that, in Figure 1, the ring valve member B lies within the counterbore 21 with its axial dimensions less than the depth of said counterbore. The ring member B is loosely mounted in the counterbore.

The seat valve member A is formed with the end thereof which constitutes the valve seat with two concentric rings 26 and 27 (Figure 6) which are radially spaced apart as may be noted. Midway of the height of the seat valve member A is a cross-bore 28 opening through the seat member. Axially of the valve seat member is an outlet or duct 29 opening an enlargement, such as a countersink 30, at the entrance end of the duct, as may be observed in Figures 1 and 6. The outlet or duct 29 affords communication for flow from the orifice of the ring valve member B to the cross-bore 28 when the shut-off valve 17 is open. As shown in Figure 1, the upper end of the valve seat member A is bored and threaded at 31 to receive the threaded stem 32 of a plug having an enlarged threaded head 33 which cooperates with threads in the upper end of the bore 20 to secure the valve seat member A in fluid escaping from the bore 20, the valve seat member A is provided with an annular groove 34 which receives a packing ring 35 to make a leak-tight joint between the valve seat member A and the bore 20. The valve seat member A rests on the ledge 73 when installed in the bore 20.

The head 10 of the fountain is formed with an upwardly inclined bore 36 terminating in a bubbler head 37 of conventional form. The bore 36, it will be observed, is in flow communication with the cross bore 28 in the valve seat member A, so that, whenever the shut-off valve 17 is opened, water will issue from the head 37 for drinking purposes, the excess water draining through an opening 38 in the bottom of the bowl 11 and through a sewer connection 39, not shown, as it is well known.

The valve seat member A is provided with a bleeder or by-pass opening 40 which is parallel to the outlet duct 29 of the valve seat member and which extends through the valve seat member from the bottom of the space between the concentric rings 26 and 27 and the cross bore 28.

Movable within the bore 15 is a plunger 41 at one end engageable with the shut-off valve 17 and at the other end is provided with a handle 42 whereby the plunger may be moved by hand pressure to open the shut-off valve 17, that is to say, by moving the plunger to the left as viewed in Figure 1. The spring 19 acts normally to maintain the shut-off valve 17 closed against its seat 16, and the handle 42 projected as shown in Figure 1.

The operation of the flow control of the present invention as associated with a bubble fountain of the type shown in Figure 1 is as follows:

The pipe 14 is connected to the city water supply to admit water to the head 10 when the shut-off valve 17 is opened, that is, moved away from its seat 16, whereupon water under city pressure enters the valve chamber through the port 22 discharging against the ring valve member B with the major force of discharge in the countersunk entrance 24. Where such pressure is high, it will bow or bend the ring valve member, about the inner margin of the inner seat ring 27, forcing the central portion thereof into the countersunk entrance 30 of the valve seat member, somewhat in the manner illustrated in Figure 4. The compression or deformation of the ring valve member, in the manner stated, will restrict the cross-sectional area of the ring orifice 23 thus reducing pressure of water issuing from said orifice and into the outlet duct 29 of the valve seat member.

Where such deformation is insufficient to bend the valve seat member so that its peripheral portion is still in contact with the wall of the counterbore 21, all passage of water from the inlet port 22 to the cross bore 28 and out through the head 37 of the bubbler fountain will be through the orifice 23 of the ring valve member B. However, the pressure of the water issuing from such ring valve member will be reduced below that pressure present in the water supply from the pipe 14. Should the water pressure be high, it will then deform the ring valve member B to a greater extent, such as that shown in Figure 5, reducing the cross-sectional area of the orifice 23 of the ring valve member greatly, and forcing part of the ring member into the space between the seat rings 26 and 27.

That portion of the structure capable of convalve member B is sometimes herein referred to as the plenum or pressure head chamber.

The ring valve member B is so constructed as to control the entry of high pressure water into the plenum or pressure head chamber to maintain the pressure in such chamber substantially uniform and below that of the pressure of the supply line.

When the shut-off valve 17 is closed, which occurs when hand pressure is removed from the handle 42, the spring 19 will move the valve 17 against the seat 16 and return the plunger 41 to its normal inoperative position which is that shown in Figure 1. Such closing of the shut-off valve cuts off water admission to the valve chamber. Any water remaining in the plenum or pressure head chamber will stay until the fountain is operated the next time. Whenever water has accumulated in the bowl 11 during the drinking process, it escapes through the drain 38 to the sewer. The pipes are so constructed that none of the drain water enters the supply to contaminate it.

It will be noted that the ring valve member B is disposed with its axis in the axis of the inlet port 22, or, in other words, with its face adjacent such port at right angles to the direction of water entry into the valve chamber.

Referring to Figure 2, there is shown a housing H comprising two separable parts—a first part 43, and a second part 44.

The first part 43 is formed with two counterbores 45 and 46 of different diameters, the counterbore 46 having the greater diameter. The part 43 is provided with a threaded aperture 47.

A hollow member 48 is provided with a hollow threaded neck 49 which is threaded into the opening 47 in the part 43 to secure the member 48 in place. The upper end of the member 48 is counterbored to receive a gasket 50 to seal the joint between the member 48 and the part 43 to prevent fluid escape. The lower portion of the number 48 is provided with a skirt 51 of greater diameter than the balance of the member 48, the diameter of the skirt 51 being greater than the diameter of the smaller counterbore 45. The skirt is counterbored at 52. The hollow member 48 is formed with a fluid passageway, a portion 53 of which is cylindrical and a portion 54 of which is divergent from the cylindrical portion 53 to the counterbore 52. The interior of the larger counterbore 46 is threaded.

A valve seat member 55 has its exterior threaded to engage the threads in the larger counterbore 46. The valve seat member itself is counterbored at 56 to receive the skirt 51 of the hollow member 48. Within the counterbore 52 of the skirt 51 is a ring valve member B.

The valve seat member 55 is provided with two concentric rings 57 and 58 as seats for the ring valve member B.

The valve seat member 55 is bored from its bottom upwardly as at 59 which bore merges with a convergent countersunk portion 60 which, in turn, communicates with a cylindrical passage 61 which terminates in a countersunk entrance 62. The bore 59 has cut-out portions 63. The valve seat member 55 is provided with a bleeder or by-pass 64 which opens into the space between the rings 57 and 58 at its upper end and opens through the lower end of the valve seat member 55.

The valve seat member 55 is provided with openings, two of which are shown at 65 and 66, extending from the bottom to the top of the member through which fluid may flow from below the valve seat member upwardly to the outlet 69.

The second part 44 of the housing H is made in the form of a cap with its flange interiorly threaded to threadedly engage the exterior of the valve seat member 55 to assemble the parts in operative relation. When the second part 44 is applied to the valve seat member 55, a gasket 67 is interposed between the adjacent margins of the parts 43 and 44 to close the joint therebetween and seal it against fluid escape.

Communicating with the bore 68 in the first part 43 of the housing through a part 70 is a laterally projecting outlet pipe 69.

Suitably attached to the housing H is an inlet pipe 71 for connection to a fluid supply to furnish fluid to the interior of the housing H.

The housing H is shown as welded to a plate 72 for supporting the housing in position in a structure.

Operation of the form of the invention shown in Figure 2, as used with a bubbler fountain, is as follows:

A shut-off valve (not shown) is interposed in the pipe 71. When this shut-off valve is opened, water from the supply line enters the hollow member 48 at supply line pressure and against the ring valve member B. As in the case of the disclosure of Figure 1, if the incoming pressure is high, it will deform the ring valve member B to force a portion thereof into the countersunk entrance 62 of the cylindrical passage 61 through the valve seat member 55 restricting the cross-sectional area of the orifice 23 in the ring valve member and reducing the pressure of the water issuing therefrom into and through the valve seat member. Water issuing through the ring valve member B will eventually fill the housing below the valve seat member, up through the openings 65 and 66 and the space between the hollow member 48 and the counterbore 45 and overflow through the port 70 into the pipe 69 to the bubbler head. This will continue as long as the shut-off valve is open. When the shut-off valve is closed, the water in the housing will occupy the space therein up to the duct 70, the space so occupied constituting a plenum or pressure head chamber.

Next time when the shut-off valve is opened, the water in the plenum or pressure head chamber will be discharged in a smooth, even stream and at low pressure.

It will be noted that the flow control of the present invention adjusts itself readily to whatever inlet pressure there is, the amount of deformation or compression of the ring valve member being proportional to the pressure of the inlet stream, that is to say, the higher the inlet pressure, the more deformation and greater restriction in the cross-sectional area of the ring orifice.

The bypasses or bleeders 40 and 61 enable escape of air that may be present in a valve chamber.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a pressure control apparatus, means providing a cylindrical valve chamber having a bottom, said bottom having an inlet through it, a valve seat member in said chamber with its seat surface axially spaced from said bottom, a normally cylindrical deformable and resilient valve ring member loosely contained in said chamber between said bottom and said seat member and having an orifice through it, said seat member having an axially disposed outlet through it and having the end of said outlet adjacent said ring valve member enlarged as a countersink, said seat member having a bleeder passage through it offset from its center, said ring valve member having the mouth of its orifice countersunk and in register with the inlet to localize the pressure of the inlet stream axially of the ring to thereby compress the ring against the seat member outlet and into the countersunk end of the same to bend said ring member to thereby reduce the cross-sectional area of the ring orifice.

2. A fluid control device comprising a casing having a passageway through it including a valve chamber having an apertured bottom, an elastic member seated on said bottom and extending substantially into engagement of the wall of said chamber, said member having an orifice through it in register with the aperture in the bottom of said chamber to provide for flexing of said member in direction of fluid flow through its orifice, whereby the orifice in said member is decreased in area on the inlet side and increased in area on the outlet side, a valve seat member in said chamber having a bore in register with the member orifice and having concentric rings constituting a ring seat surface about its bore against which said member is bent or flexed by the pressure of the fluid entering said chamber, excessive pressure of the fluid supply forcing part of the elastic member into the space between said concentric rings.

3. In a pressure control apparatus, a housing having a hollow interior, means suspended from the top of the housing within said interior and providing a downwardly directed fluid inlet and valve chamber means, said housing having a fluid outlet above the bottom of said suspended means, said valve chamber means including a valve seat member having concentric valve engaging rings in its top side and having a downwardly extending central port for fluid passage, an elastic ring valve member on said valve engaging rings, said valve seat member being shaped to provide a countersunk entrance to said port with the top margin of the entrance constituting the inner periphery of the inner of said valve engaging rings, said ring valve member being depressable against the top margin of said countersunk entrance to bend the ring valve member into said countersink to reduce the area of the orifice through the ring valve by pressure of fluid entering said apparatus, the admission of fluid under pressure flexing the central portion of said ring valve member into said countersunk port entrance to bend the valve member to restrict flow through it, the fluid after leaving the ring valve orifice passing downwardly and outwardly about said suspended means thence upwardly thereabout to and out of said outlet.

4. In a fluid flow controlled device including a housing having inlet and outlet passages, a resiliently flexible control element positioned in said housing between said passages and having a fluid controlled orifice extending in the direction of the fluid flow between said passages, said element being seated on the inlet passage side in said housing and being deflectable by fluid pressure toward the outlet passage, and an abutment member in the outlet passage side of the housing having a central opening generally aligned with said orifice and spaced concentric surfaces against which said element bears with an annular groove between said surfaces in which a portion of said element is resiliently deflectable in response to fluid pressure to assist in changing the size of said orifice for controlling the pressure of fluid entering said outlet passage from said element.

5. In a fluid flow controlled device including a housing having inlet and outlet passages, a resiliently flexible control element positioned in said housing between said passages and having a fluid controlled orifice extending in the direction of the fluid flow between said passages, said element being seated on the inlet passage side in said housing and being deflectable by fluid pressure toward the outlet passage, and an abutment member in the outlet passage side of the housing having a central opening generally aligned with said orifice and spaced concentric surfaces against which said element bears with an annular groove between said surfaces in which a portion of said element is resiliently deflectable in response to fluid pressure to assist in changing the size of said orifice for controlling the pressure of fluid entering said outlet passage from said element, said member also having a bleeder opening connecting the bottom of said groove to the outlet passage to minimize trapping of fluid in said groove.

6. In a fluid flow controlled device including a housing having inlet and outlet passages, a resiliently flexible control element positioned in said housing between said passages and having a fluid controlled orifice extending in the direction of the fluid flow between said passages, said element being seated on the inlet passage side in said housing and being deflectable by fluid pressure toward the outlet passage, and an abutment member in the outlet passage side of the housing having a central opening generally aligned with said orifice and spaced concentric surfaces against which said element bears with an annular groove between said surfaces in which a portion of said element is resiliently deflectable in response to fluid pressure to assist in changing the size of said orifice for controlling the pressure of fluid entering said outlet passage from said element, said central opening at its end facing said element being enlarged for receiving a portion of the center of said element deflected therein by fluid pressure in the controlling of the size of said orifice.

7. In a fluid flow controlled device including a housing having inlet and outlet passages, a resiliently flexible control element positioned in said housing between said passages and having a fluid controlled orifice extending in the direction of the fluid flow between said passages, said element being seated on the inlet passage side in said housing and being deflectable by fluid pressure toward the outlet passage, and an abutment member in the outlet passage side of the housing having a central opening generally aligned with said orifice and spaced concentric surfaces against which said element bears with an annular groove between said surfaces in which a portion of said element is resiliently deflectable in response to fluid pressure to assist in changing the size of said orifice for controlling the pressure of fluid entering said outlet passage from said element, said housing having a plenum chamber between said central opening and the outlet passage.

8. In a fluid flow controlled device including a iently flexible control element positioned in said housing between said passages and having a fluid controlled orifice extending in the direction of the fluid flow between said passages, said element being seated on the inlet passage side in said housing and being deflectable by fluid pressure toward the outlet passage, and an abutment member in the outlet passage side of the housing having a central opening generally aligned with said orifice and spaced concentric surfaces against which said element bears with an annular groove between said surfaces in which a portion of said element is resiliently deflectable in response to fluid pressure to assist in changing the size of said orifice for controlling the pressure of fluid entering said outlet passage from said element, said housing having a plenum chamber between said central opening and the outlet passage, and a fountain bubbler head connected to the outlet passage and in communication with said chamber.

ROBERT A. ROSENBLUM.

REFERENCES CITED

The following references are of record in the file of this patent:

UNITED STATES PATENTS

| Number | Name | Date |
| --- | --- | --- |
| 1,657,663 | Devereux | Jan. 31, 1928 |
| 2,389,134 | Brown | Nov. 20, 1945 |